(12) United States Patent
Walker

(10) Patent No.: US 7,268,638 B2
(45) Date of Patent: Sep. 11, 2007

(54) APPARATUS AND METHOD FOR DATA RATE MULTIPLICATION

(76) Inventor: Harold R. Walker, 78 Oliver Ave., Edison, NJ (US) 08820

( * ) Notice: Subject to any disclaimer, the term of this patent is extended or adjusted under 35 U.S.C. 154(b) by 707 days.

(21) Appl. No.: 10/420,124

(22) Filed: Apr. 22, 2003

(65) Prior Publication Data
US 2003/0215009 A1    Nov. 20, 2003

Related U.S. Application Data

(60) Provisional application No. 60/377,915, filed on May 3, 2002.

(51) Int. Cl.
*H03K 7/00* (2006.01)
(52) U.S. Cl. .................. 332/106; 332/109; 332/112; 375/239
(58) Field of Classification Search ........... 332/106, 332/109, 112; 375/239
See application file for complete search history.

(56) References Cited

U.S. PATENT DOCUMENTS 4,206,316 A * 6/1980 Burnsweig et al. ...... 178/66.1

6,445,737 B1 * 9/2002 Walker ..................... 375/239

* cited by examiner

*Primary Examiner*—Arnold Kinkead
(74) *Attorney, Agent, or Firm*—Myers Dawes Andras & Sherman LLP

(57) ABSTRACT

The invention is a method for pulse position modulating signals which are synchronized to clocked bit periods using a clock comprising the steps of generating two, three or n signals to mark the presence of digital ones during corresponding n time slots occurring during the same bit period. The two, three or n signals are combined into a single data channel to utilize abrupt phase changes of pulses in a carrier signal at a carrier frequency, the phase changes having a very short duration to mark the presence of digital ones only. The combination of the n signals into a single data channel comprises gating each of the n signals in a sequence of serially delayed time slots corresponding to each of the n signals during a portion of the same bit period in the single data channel during time positions reserved for unexpressed zeroes.

20 Claims, 9 Drawing Sheets

APPARATUS AND METHOD FOR DATA RATE MULTIPLICATION

RELATED APPLICATIONS

The present application is related to U.S. Provisional Patent Application Ser. No. 60/377,915, filed on May 3, 2002, which is incorporated herein by reference and to which priority is claimed pursuant to 35 USC 119.

BACKGROUND OF THE INVENTION

1. Field of the Invention

The present invention relates to a method whereby the data rate that can be passed through a single radio frequency channel using phase shift or missing cycle modulation can be effectively doubled without increasing the bandwidth of the channel.

2. Description of the Prior Art

"Digital Modulation Device in A System And Method of Using the Same". U.S. Pat. No. 6,445,737, which issued to the present inventor, and which is incorporated herein by reference, describes a modulation method which transmits a single radio frequency with phase changes at bit period intervals in one to three cycles of the carrier frequency. The modulation is accomplished by either reversing the RF phase for one or more cycles, or by removing one or more cycles from the RF frequency which is transmitted. The method is described as 'Pulse Position Phase Reversal Keying' (PPPRM) or (3PRK), or as 'Missing Cycle Modulation' (MCM).

The spectrum of these modulation methods is a single frequency line containing more than 95% of the transmitted energy, plus a plurality of sinx/x spectral lines which spread over a wide bandwidth containing less than 5% of the radiated energy. The sinx/x spikes do not contain any useful phase modulation information and can be removed by filtering.

The detector circuit detects the missing cycle, or phase change pulse, or the reversing phase cycle. The detected output is a very narrow pulse one to three RF cycles wide.

The pulses are created in a modulation circuit shown in FIG. 1 that creates a pulse one RF cycle wide at the RF frequency on the rising edge of the data rate clock. This pulse (at time 1) is created only for a digital one. If a digital zero is to be represented, a delay is inserted to cause the zero pulse to occur late (at time 2) with respect to the clock. A decoding circuit utilizes this pulse delay as an indication of a digital one or zero.

In FIG. 1, the pulses for a digital one pass through gates 11 and 12 to the one shot generator 15. The one shot generator 15 creates a pulse having a time duration of one or two RF cycles. This is then applied to a modulator. If phase reversal keying is to be used, the XOR gate 16 is used. If the pulse is to be removed, the AND gate 17 is used. A digital zero passes through gates 13, 14 and 12, to cause a pulse delayed by one bit period plus a small delay amount.

It is not necessary to transmit a pulse representing a zero, since the decoding circuitry (FIG. 2) responds only to the digital ones. A sequence of 10000000100-bits would have a pulse for the 1's, followed by a period of seven bit periods where there would be no alteration in the RF cycles. The decoder recognizes the phase shifts representing the ones, and the RF cycles in which there is no change will be decoded as zeros. The presence of a digital one sets the data clock. If there is a pulse at the start of the data clock, the data is decoded as a one. If there is no pulse the information is read and decoded as a zero.

BRIEF SUMMARY OF THE INVENTION

The invention is an improvement in a method for phase pulse position modulating signals comprising the step of utilizing abrupt pulse phase changes in a carrier frequency. The phase changes have a very short duration to mark the presence of digital ones only. The carrier is a single frequency that does not change in frequency or phase except at the time of the abrupt phase change pulses. Additional abrupt phase changes of the same carrier, spaced in time, are used to carry information relative to additional independent data channels.

The invention is also an improvement in an apparatus for pulse position modulating signals comprising a means for generating abrupt time spaced phase changes in a carrier frequency which has the phase changes of a very short duration to mark the presence of digital ones only. The improvement further comprises gating means for generating an optimal adjustable temporal spacing between the abrupt phase change pulses.

The improvement also comprises a decoding means employing gating periods to separate the phase pulse position modulated channels and reject all signals not within the gate period. The improvement further comprises separate decoding means for each channel to decode the digital ones and zeros, and to provide a data clock for the individual channels.

The invention can also be defined as a method for phase pulse position modulating signals which are synchronized to clocked bit periods using a clock comprising the steps of utilizing abrupt phase changes of pulses in a carrier signal at a carrier frequency in which the phase changes have a very short duration to mark the presence of digital ones only. A first signal is generated to mark the presence of digital ones during a first time slot. A second signal is generated to mark the presence of digital ones during a second time slot subsequent to the first time period. The first and second time slots occur during the same bit period. The first and second signals are combined into a single data channel.

The improvement further comprises the step of generating a common gate pulse in an encoder and gating the first and second signals by the common gate pulse to modulate the carrier signal.

The improvement further comprises the step of providing a first clock signal in a decoder linked to the arrival of the first signal to generate a first gate pulse derived from a clock pulse linked to the arrival of the first signal. The arrival of the first signal during the first gate pulse is decoded as a digital one and otherwise is decoded as a digital zero in a first data channel output in all other timing conditions. A delayed second clock signal is generated in the decoder. The arrival of the second signal during the second gate pulse derived from the delayed second clock signal is decoded as a digital one and is otherwise decoded as a digital zero in a second separate data channel output during all other timing conditions.

The improvement further comprises the step of gating the detected first signal into the first half of the bit period and gating the second signal into the second half of the same bit period. In one embodiment the step of gating the first signal and second signals comprises the step of gating the signal and second signals using a 2-times clock signal.

The improvement further comprises the steps of receiving in a two-bit shift register a 2-times data rate signal combined into a single data channel, sampling both bits of the shift register at a 1-times data rate and separately storing each bit in a separate memory circuit, and outputting the separately stored bits as a two separate 1-times data channels.

The single data channel is a modulated RF data signal having the first and second signals combined into the single data channel so that the method further comprises the step of detecting the modulated phases of the RF signal, low pass filtering the detected phases, differentiating the filtered phases to generate spikes to mark an abrupt phase change, and forming stretched square wave pulses from the spikes. The step of detecting the modulated phases of the RF data signal comprises amplifying or signal conditioning the modulated RF signal, generating a phase reference signal from the RF data signal and gating an unaltered form of the modulated RF data signal with the phase reference signal to generate a pulse corresponding to a detected abrupt phase change of the RF data signal.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

In the prior art, a delayed pulse was used to indicate a zero. Since the zeros are not needed or used, the time position of the zero pulse can be used to carry a second or additional data channel(s). In fact, a series of time delayed pulses can be used to represent two, three or more channels by selectively gating the pulses, thus increasing the data throughput of the RF channel accordingly.

Figure 3:
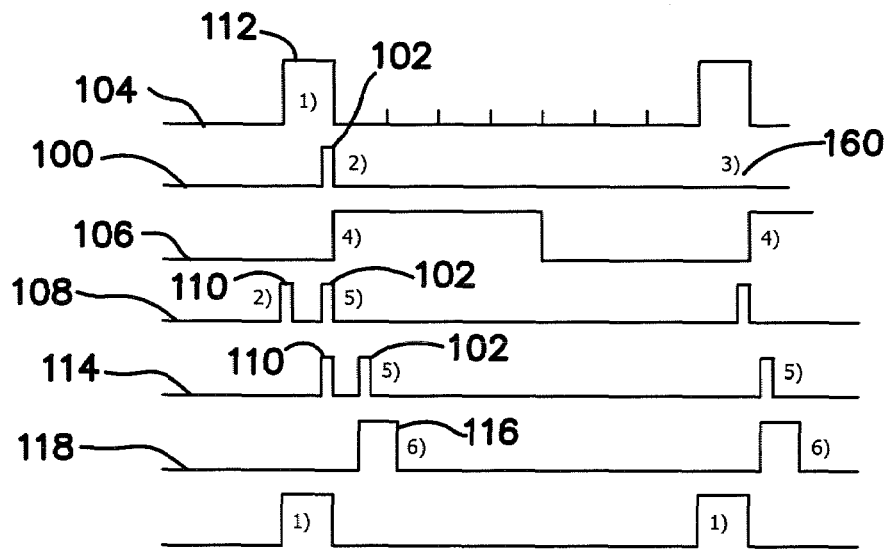
FIG. 3 is a timing diagram showing the timing sequences for adding a second pulse.

FIG. 3 shows the pulse timing applicable in part to both the prior art and to the present invention. Pulses 102 from a detector are shown on line 100. There is a pulse 102 only when a digital one is transmitted, coinciding with the rising edge of the clock. At position or time 160 there is no pulse and the decoder will decode this as a digital zero. On Line 104, a gate circuit pulse 112 opens the decoder to the incoming pulses for a short time period only, typically ⅛ the bit period. If the gate is open and the detected pulse 102 occurs, it is decoded as a one and the data clock on line 106 is set to decode the data stream. Gating is used to reduce the effects of noise and multipath signals.

In line 108, a second pulse 110 representing a second channel has been added. The decoder circuit will see both pulses 110 and 102 if they occur within the gate pulse 112. The detector circuit will automatically lock to the first pulse 110 of these pulses, ignoring the second pulse 102. The data clock will be reset by the leading pulse 110. If there are three or more pulses, the decoder will 'slip' to respond to the first pulse in the sequence, thereby keeping the clock timing at a fixed position.

Figure 6:
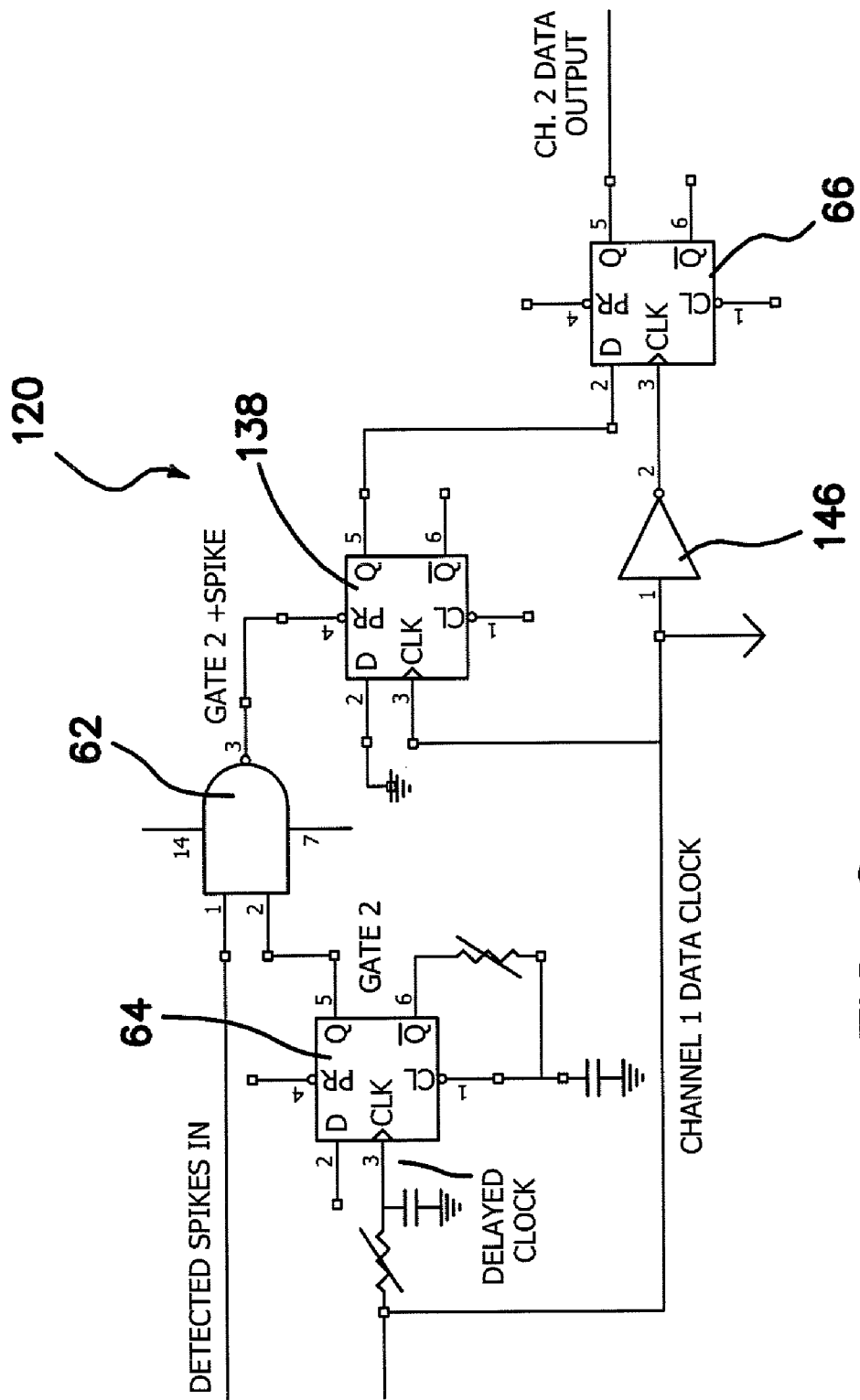
FIG. 6 is a schematic diagram for added circuitry for second channel detection.

In line 114, the second pulse 102, which will not reset the clock, is shown outside the gate pulse 112. A second gate 116 on line 118 can now be used to pass the delayed pulse 102, which represents the second data channel. The decoder circuit for the first data channel, including clock restoration, is shown in the prior art circuit of FIG. 2. The decoder circuit 120 for the second channel is shown in FIG. 6.

Figure 1:
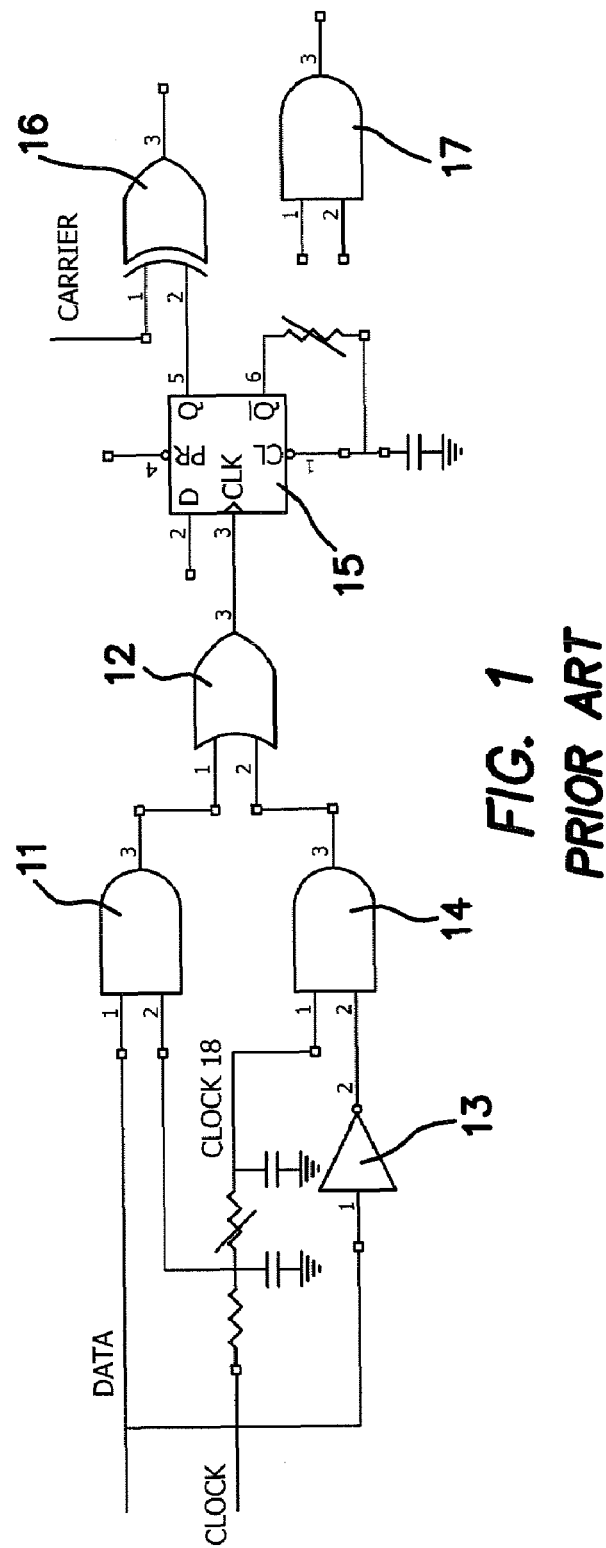
FIG. 1 is a schematic diagram of a prior art, one and zero encoder with an RF modulator.
Figure 4:
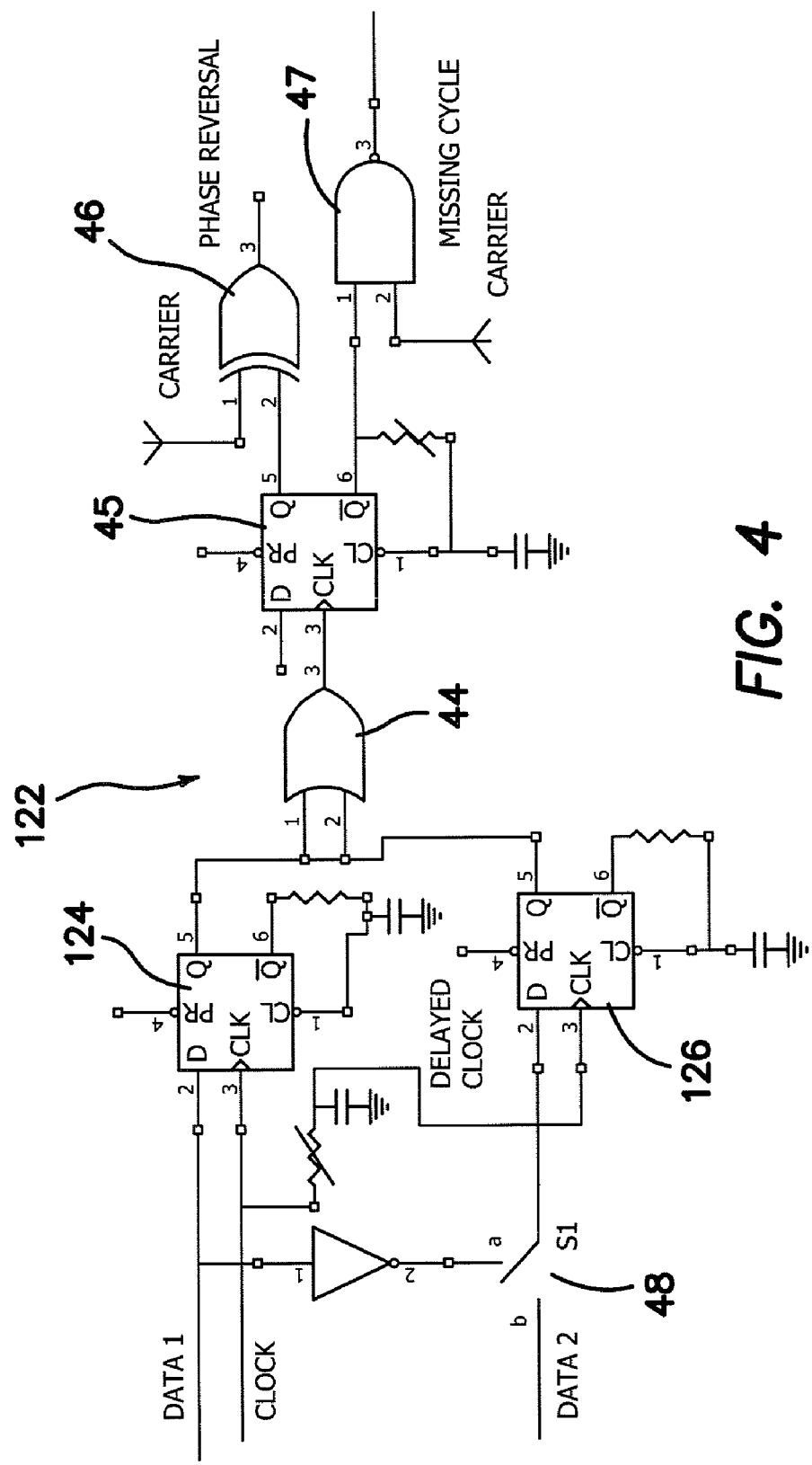
FIG. 4 is a schematic diagram of an encoder for two channels with an RF modulator.

FIG. 4 is a schematic of a modified encoder 122 which schematic shows the changes made to the encoder of FIG. 1 to enable either one or two channel use. The AND gates 11 and 14 of FIG. 1 have been replaced by one shot generators 124 and 126 to create a very narrow pulse that passes through the OR gate 44 to cause the single cycle altering one shot 45 to alter the RF modulation via gates 46 or 47.

A switch 48 (S1) has been provided to allow changing from the single pulse method with ones and zeros to a double pulse with ones only. With the switch in position (b), there are two altered cycles for each of two channels, representing ones-only in the RF stream. The earliest of these to occur is the change for channel one, while the delayed pulse is for channel 2. This is seen in the detected pulses shown in line 114 of FIG. 3. The clock delay is made slightly less than the gate width so that both pulses can occur initially within the gate pulse 116.

Figure 2:
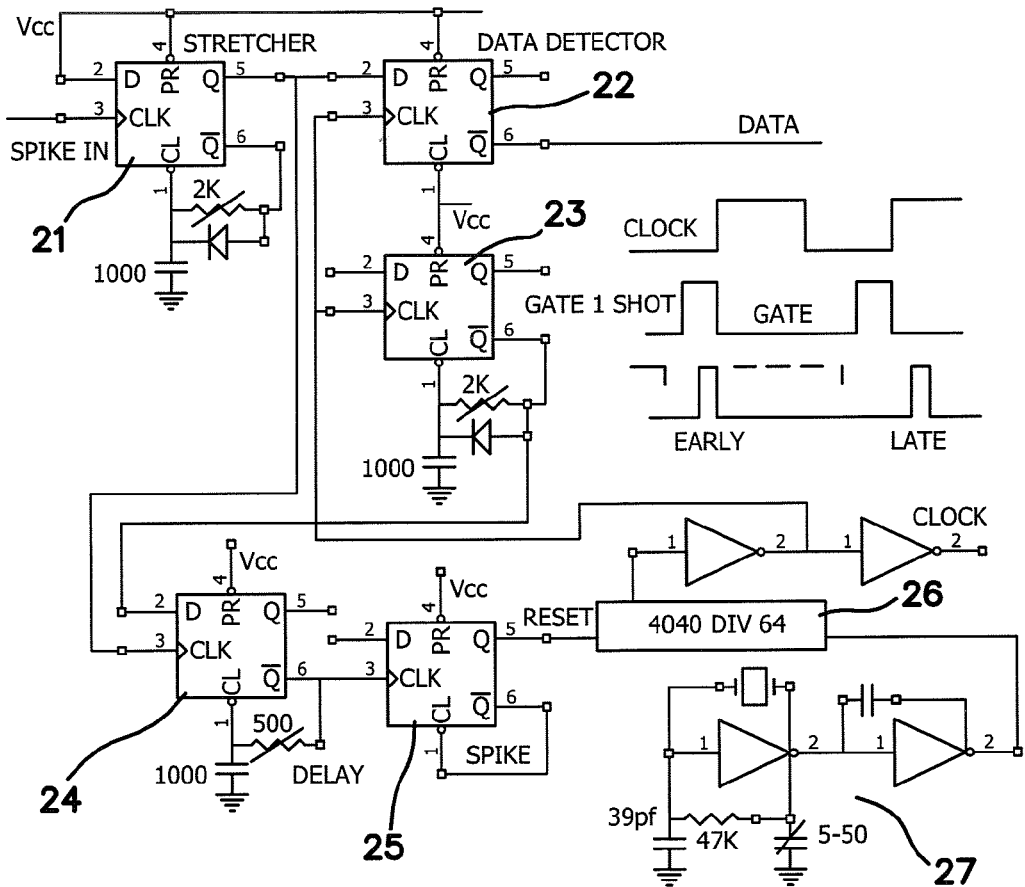
FIG. 2 is a schematic diagram of a prior art, data decoder for one channel.
Figure 10:
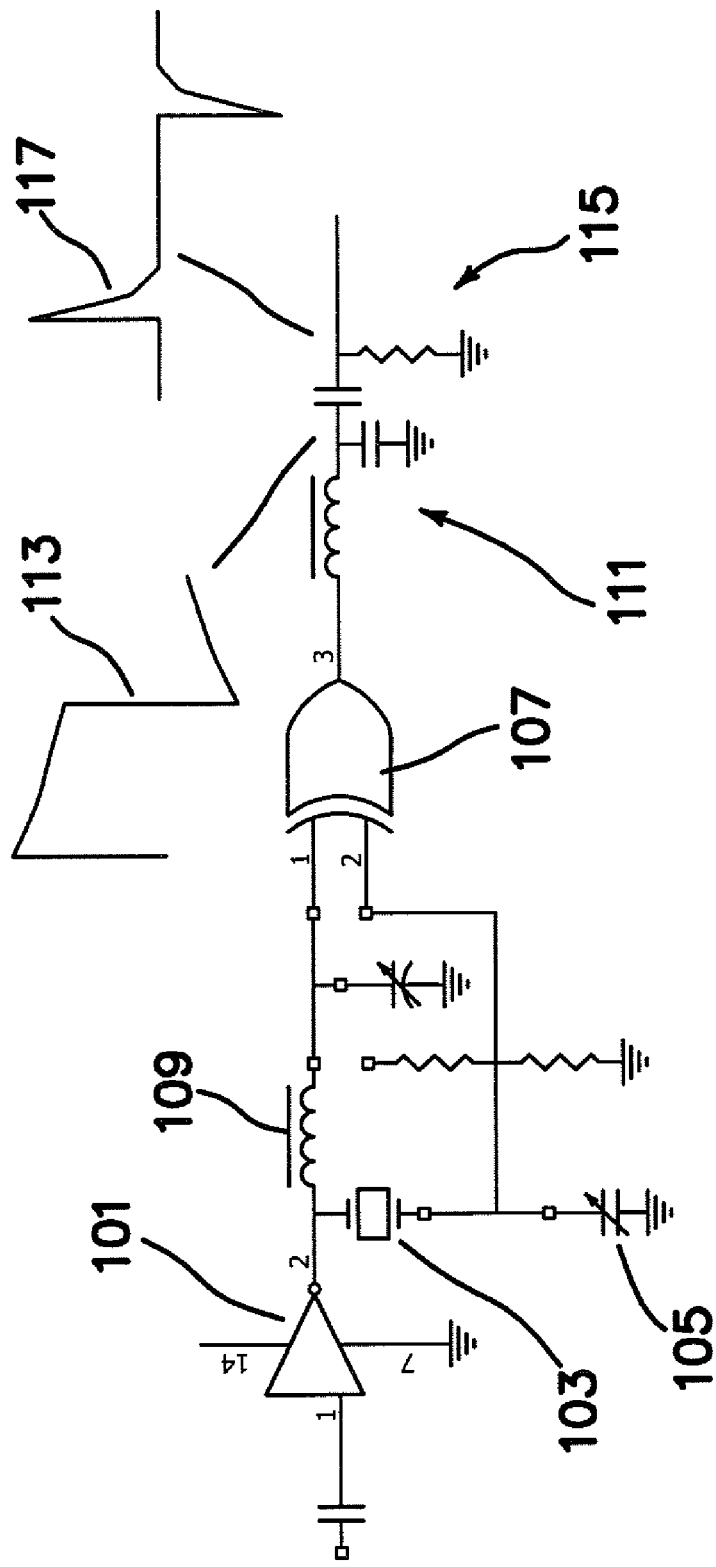
FIG. 10 is a schematic diagram for a phase detector for pulse position phase reversal keying.

FIG. 2 shows the prior art decoder circuit for a single channel. The very narrow pulses from the phase detector in FIG. 10 are input to a pulse stretcher 21. The stretched pulse is used as an input to the 'D' input of data detector 22. The leading edge of the stretched pulse is also applied to a one shot delay circuit 24, whose output drives a spike generator 25 that resets a a divide by 64 counter 26. The output of this counter can provide both 1X and 2X clocks. Counter 26 resets the data clock to have a rising edge only slightly delayed from the incoming pulse. In order to prevent noise and unwanted signals such as multiplath signals from resetting the clock, a gating circuit 23 is used. A time delay period of approximately ⅞ bit period is followed by a gate open period of approximately ⅛ bit period. The gate closes with the rising edge of the clock. This gating pulse, which is applied to the 'D' input of the delay latch 24, prevents any signal outside the gate period from resetting the clock.

The data from the stretcher 21 is clocked into the data detector 22. If there is a pulse present, the detector 22 outputs a one and holds it until the next clock rise. If there is no pulse, or the second pulse is too late, a digital zero is clocked out. The delayed pulses representing zeros are not used. Thus making it possible to use that time slot for a second channel.

Figure 5:
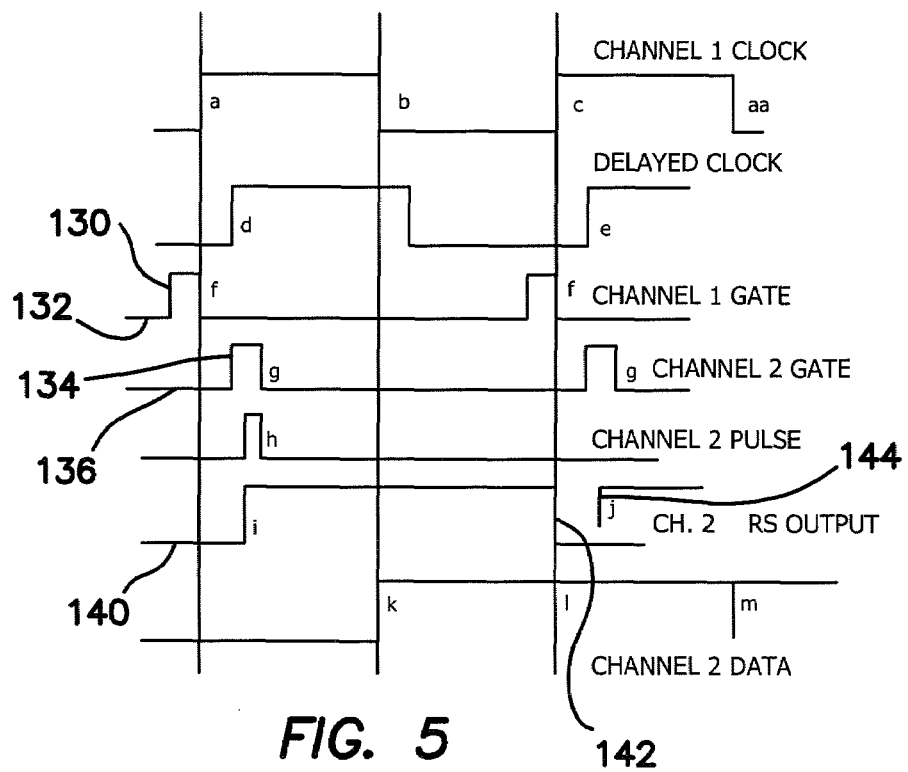
FIG. 5 is a timing diagram showing the timing sequence for two channels.

The timing required for decoding the second channel is shown in FIG. 5. The decoder 128 of FIG. 2 provides a clock which is linked to the timing of the first pulse to arrive, which must occur within the gate period shown as pulse 130 on line 132. By delaying this clock, a second gate 134 on line 136 can be created. If a pulse occurs during this gate period 134, it will preset the data decoder to a one. This preset is automatically cleared by the undelayed clock as shown as implemented in the circuit of FIG. 6.

FIG. 6 shows the added circuitry used to detect the second channel. The recovered clock from FIG. 2 is delayed slightly to the second gate 64. If a spike or pulse representing the timing for channel 2 appears, the gate 64 plus the pulse appear at the output of the AND gate 62 to preset the RS flip flop 138 as shown on line 140 of FIG. 5. This is automatically cleared by the undelayed clock at the start of the next clock cycle at time 142.

If there is no repeated one, the RS flip flop 138 remains in the clear position. If there is a repeated one, the RS flip flop 138 is preset to a one as shown at time 144.

The channel 1 clock is inverted by inverter 146 and applied to a 'D' flip flop 66 to compare with the 'D' input and to output a one or zero for channel 2, which is delayed from the data output of channel 1 by ½ clock period.

Figure 7:
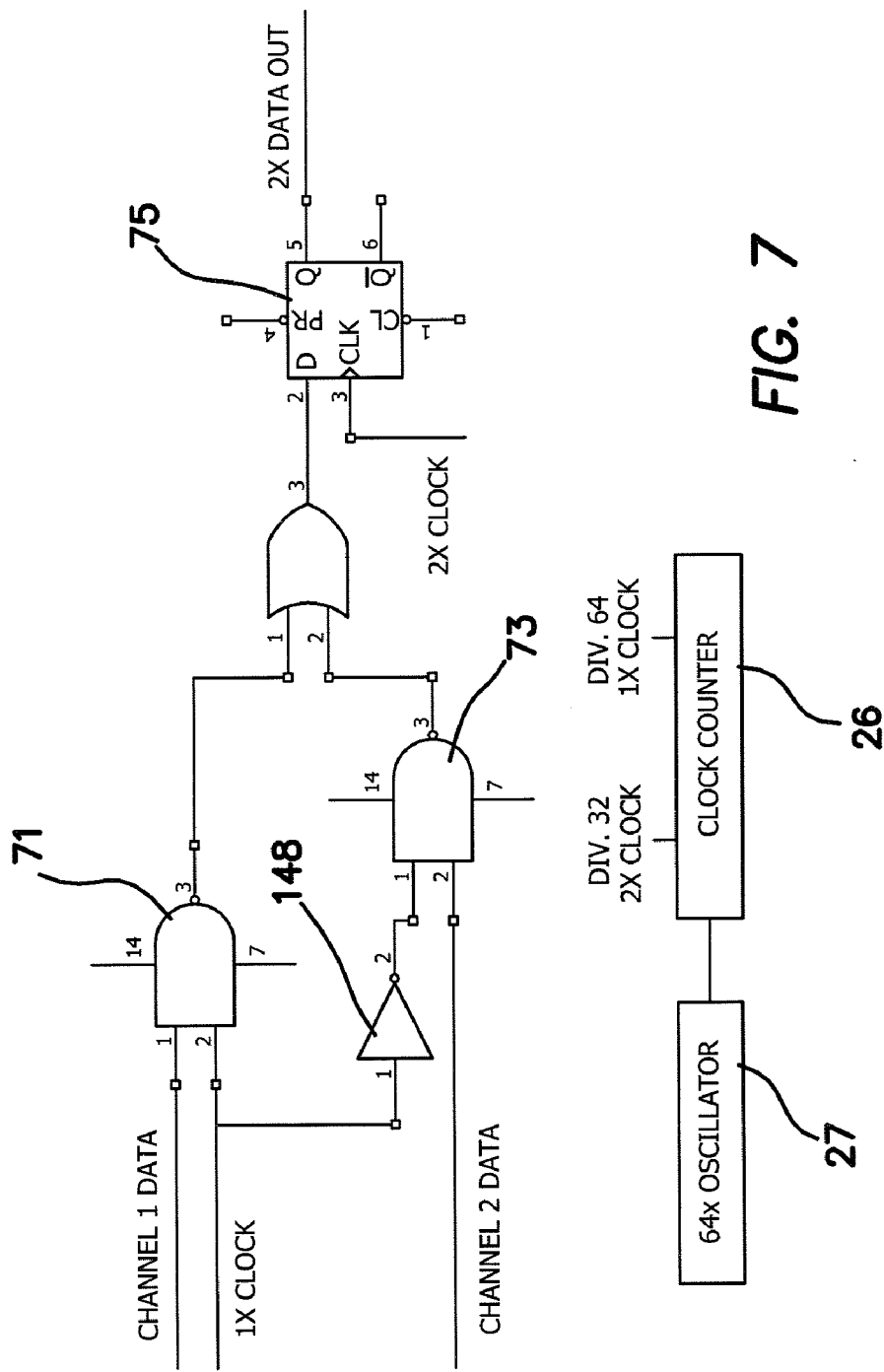
FIG. 7 is a schematic diagram for a conversion circuit of double pulses to double data rate.

FIG. 7 shows how the two channels can be combined to produce one channel at double the data rate. The method essentially sends the bits from channels one and two alternately in a single data stream. The data from channel one is combined with the data clock in the AND gate 71 to produce an output which is present for one half clock cycle. This output sets the 'D' input of the 'D' flip flop 75 so that a 2X clock will cause a corresponding one or zero output on each 2X clock rise. The data clock is inverted by inverter 148 for channel two and it's associated AND gate 73, so that channel 2 appears at the 'D' input of flip flop 75 for the other half data clock cycle. In this manner, channels one and two are combined in alternating sequence to produce a data rate at twice the data rate of the individual channels. The 1X and 2X clocks are obtainable from the original clock frequency oscillator 27 and dividing counter 26.

Figure 8:
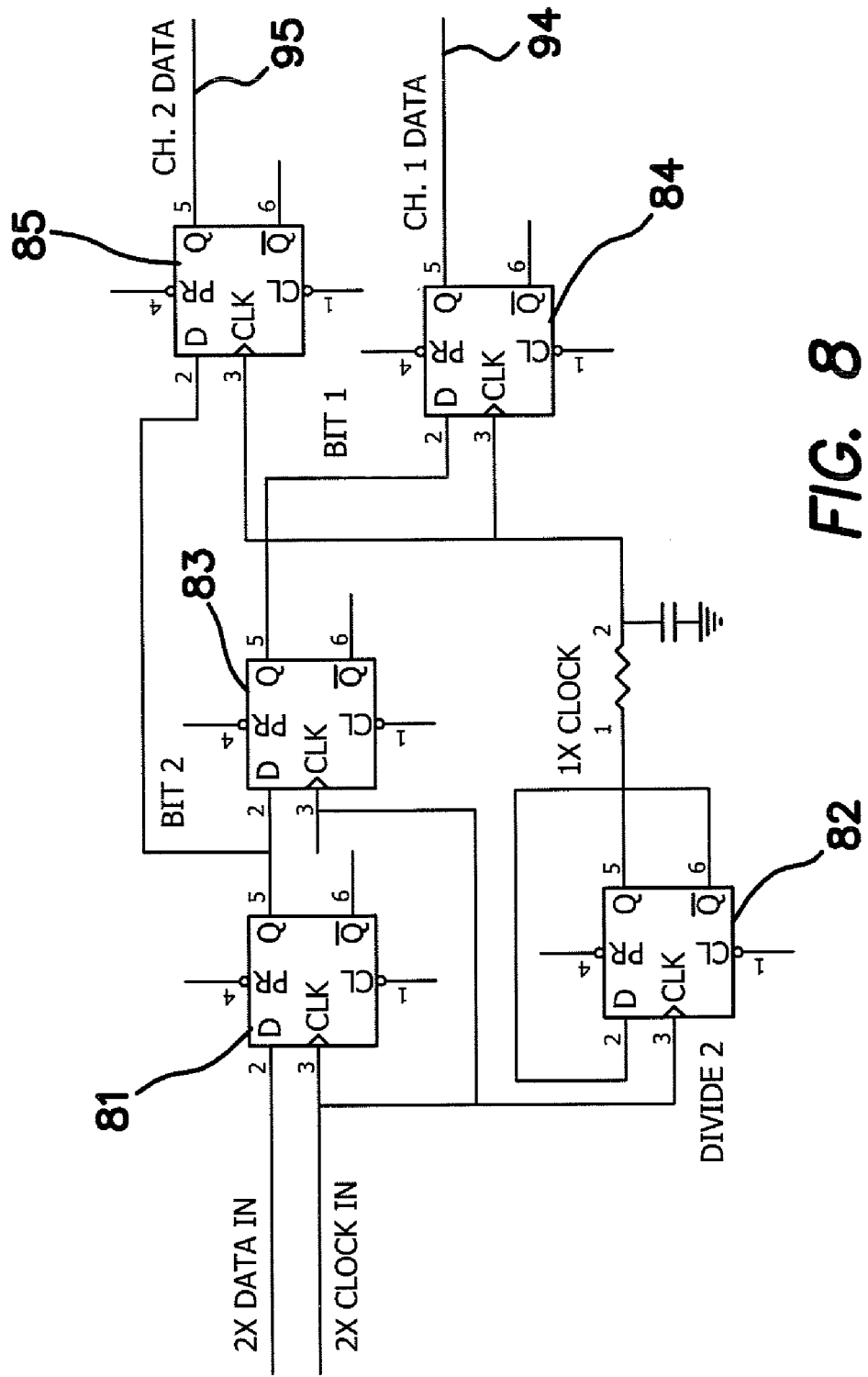
FIG. 8 is a schematic diagram for a conversion circuit of double data rate to dual pulses.

FIG. 8 shows how the double data rate can be converted back to two individual channels if desired. The upper two 'D' flip flops 81, 83 form a shift register to accept the incomming 2X data rate. The original 2X clock is divided by two in flip flop 82 to obtain a 1X clock, which is used to sample the outputs of the shift register 81, 83 once every two incoming bits. The first bit to arrive at the shift register 81, 83 is shifted to the second stage 83 as the next bit arrives. Both the first and second bits are then sampled by the output 'D' flip flops 84, 85 respectively to become the data for channels one and two respectively.

Figure 9:
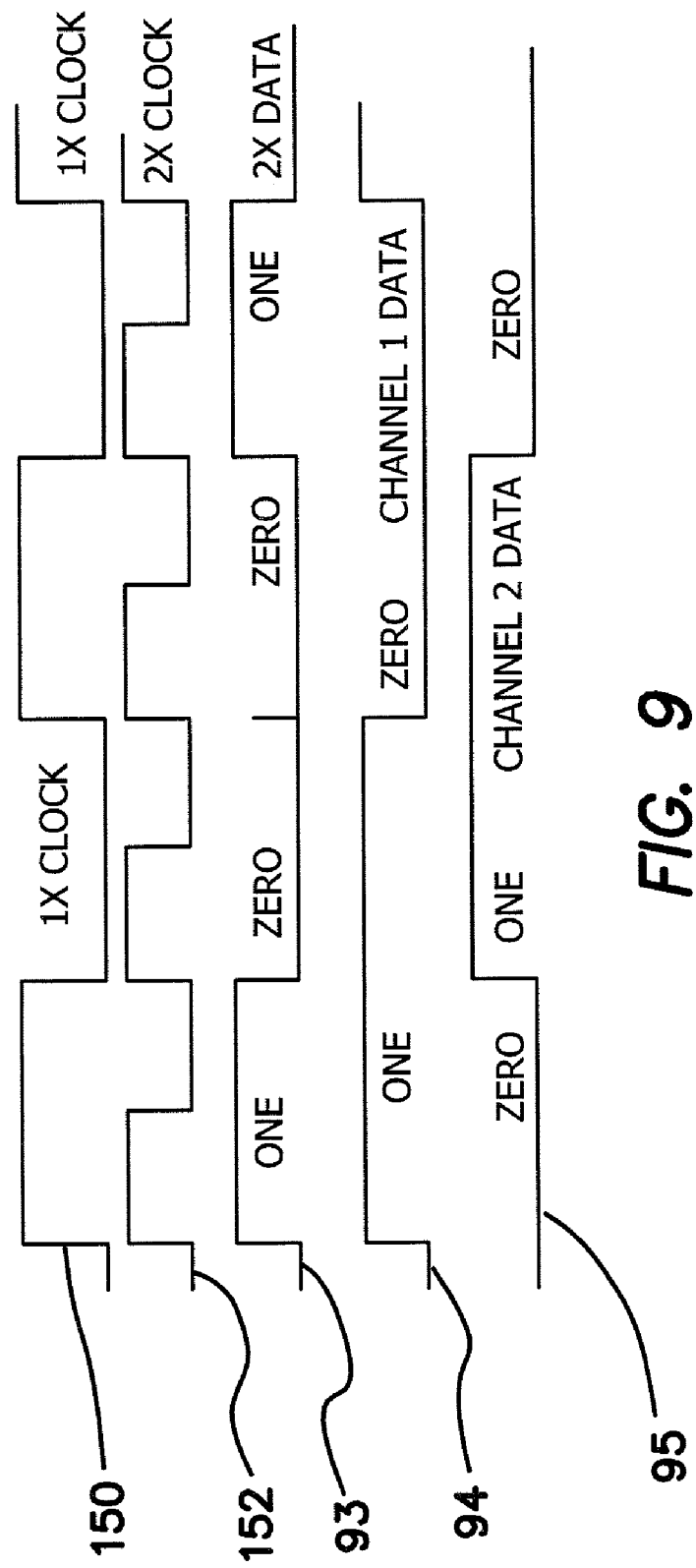
FIG. 9 is a timing diagram showing the timing for double data rate.

FIG. 9 shows the timing for FIGS. 7 and 8. Channel two data 95 is delayed behind channel one data 94 by ½ of the 1X clock cycle 150, or by one full 2X clock cycle 152. By switching between the two at the 2X clock rate and adding them in sequence, the 2X data rate 93 is achieved. Conversely, when two bits at the 2X rate are stored in the shift register 81, 83 and read out by the 1X clock, two separate channels are obtained.

FIG. 10 shows a phase detector applicable to the present invention. The limiting amplifier 101 raises the incoming RF signal to CMOS levels. The signal is split to follow two different paths. The path through the crystal 103 and the tuning capacitor 105 creates a phase reference to be applied to one input of the XOR gate 107, used as a phase detector. The other path, via the inductor 109, passes the signal unaltered to the other input of the phase detector 107. A low pass filter 111 removes any remaining RF signals to result in a pulsed output shown in the inset as pulse 113. This output can be differentiated by differentiator 115 to yield spikes 117 which are used by the pulse stretcher 21.

It is obvious to those skilled in the art that minor time delays must often be inserted in the clocking of the above circuitry so that the data being sampled is steady at the time of sampling.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An improvement in a method for pulse position modulating and combining digital signals comprising utilizing abrupt pulse phase changes in a single carrier signal with a single carrier frequency, the phase changes having a very short duration to mark the presence of digital ones only in two or more digital channels encoded into the single carrier signal.

2. The improvement of claim 1 in which the carrier is a single frequency that does not change in frequency or phase except at the time of the abrupt phase change pulses.

3. The improvement of claim 1 in which additional abrupt phase changes of the same carrier, spaced in time, are used to carry information relative to additional independent data channels.

4. An improvement in an apparatus for pulse position modulating and combining digital signals comprising means for generating abrupt time spaced phase changes in a single carrier signal with a single carrier frequency, the phase changes having a very short duration to mark the presence of digital ones only in two or more digital channels encoded into the single carrier signal.

5. The improvement of claim 4 in which the carrier is a single frequency that does not change in frequency or phase except when the means generates an abrupt phase change pulse.

6. The improvement of claim 4 in which the means generates additional abrupt phase changes of the same carrier, spaced in time, are used to carry information relative to additional independent data channels.

7. The improvement of claim 4 further comprising gating means for generating an optimal adjustable temporal spacing between the abrupt phase change pulses.

8. An improvement in an apparatus for pulse position modulating and combining digital signals comprising decoding means employing gating periods to separate two or more the pulse position modulated channels and to reject all digital signals not within the gate period.

9. The improvement of claim 8 further comprising separate decoding means for each channel to decode the digital ones and zeros, and to provide a data clock for the individual channels.

10. An improvement in an apparatus for pulse position modulating and combining digital signals comprising means for generating abrupt time spaced phase changes in a single carrier signal with a single carrier frequency, the phase changes having a very short duration to mark the presence of digital ones only in two or more digital channels and decoding means employing gating periods to separate the pulse position modulated channels in the single carrier signal and to reject all signals not within the gate period to realize a single higher data rate pulse position modulating channel in the single carrier signal.

11. An improvement in a method for pulse position modulating and combining digital signals which are synchronized to clocked bit periods using a clock comprising: utilizing abrupt phase changes of pulses in a single carrier signal at a single carrier frequency, the phase changes having a very short duration to mark the presence of digital ones only in two or more digital channels to be encoded into the single carrier frequency; generating a first pulse position modulating signal to mark the presence of digital ones during a first time slot; generating a second pulse position modulating signal to mark the presence of digital ones during a second time slot subsequent to the first time period, the first and second time slots occurring during the same bit period as determined by the clock; and combining the first and second pulse position modulating signals into a single pulse position modulating data channel in the single carrier signal.

12. The improvement of claim 11 further comprising generating a common gate pulse in an encoder and gating the first and second signals by the common gate pulse to modulate the carrier signal.

13. The improvement of claim 11 further comprising providing a first clock signal in a decoder linked to the arrival of the first signal to generate a first gate pulse, arrival of the first signal during the first gate pulse being decoded as a digital one and otherwise being decoded as a digital zero in a first data channel output, generating a delayed second clock signal in the decoder, arrival of the second signal during the second gate pulse being decoded as a digital one and otherwise being decoded as a digital zero in a second separate data channel output.

14. The improvement of claim 13 further comprising gating the first signal into the first half of the bit period and gating the second signal into the second half of the same bit period.

15. An improvement in a method for pulse position modulating signals which are synchronized to clocked bit periods using a clock comprising: utilizing abrupt phase changes of pulses in a carrier signal at a carrier frequency, the phase changes having a very short duration to mark the presence of digital ones only; generating a first signal to mark the presence of digital ones during a first time slot; generating a second signal to mark the presence of digital ones during a second time slot subsequent to the first time period, the first and second time slots occurring during the same bit period; and combining the first and second signals into a single data channel;

providing a first clock signal in a decoder linked to the arrival of the first signal to generate a first gate pulse, arrival of the first signal during the first gate pulse being decoded as a digital one and otherwise being decoded as a digital zero in a first data channel output, generating a delayed second clock signal in the decoder, arrival of the second signal during the second gate pulse being decoded as a digital one and otherwise being decoded as a digital zero in a second separate data channel output; and gating the first signal into the first half of the bit period and gating the second signal into the second half of the same bit period, where gating the first signal and second signals comprises gating the signal and second signals using a 2-times clock signal.

16. An improvement in a method for pulse position modulating signals which are synchronized to clocked bit periods using a clock comprising: utilizing abrupt phase changes of pulses in a carrier signal at a carrier frequency, the phase changes having a very short duration to mark the presence of digital ones only; generating a first signal to mark the presence of digital ones during a first time slot; generating a second signal to mark the presence of digital ones during a second time slot subsequent to the first time period, the first and second time slots occurring during the same bit period; and combining the first and second signals into a single data channel; and receiving in a two-bit shift register a 2-times data rate signal combined into a single data channel, sampling both bits of the shift register at a 1-times data rate and separately storing each bit in a separate memory circuit, and outputting the separately stored bits as a two separate 1-times data channels.

17. An improvement in a method for pulse position modulating signals which are synchronized to clocked bit periods using a clock comprising: utilizing abrupt phase changes of pulses in a carrier signal at a carrier frequency, the phase changes having a very short duration to mark the presence of digital ones only; generating a first signal to mark the presence of digital ones during a first time slot; generating a second signal to mark the presence of digital ones during a second time slot subsequent to the first time period, the first and second time slots occurring during the same bit period; and combining the first and second signals into a single data channel;

where the single data channel is a modulated RF data signal having the first and second signals combined into the single data channel and further comprising detecting the modulated phases of the RF signal, low pass filtering the detected phases, differentiating the filtered phases to generate spikes to mark an abrupt phase change, and forming stretched square wave pulses from the spikes.

18. The improvement of claim 17 where detecting the modulated phases of the RF data signal comprises amplifying the modulated RF signal, generating a phase reference signal from the RF data signal and gating an unaltered form of the modulated RF data signal with the phase reference signal to generate a pulse corresponding to a detected abrupt phase change of the RF data signal.

19. An improvement in a method for pulse position modulating and combining n digital signals which are synchronized to clocked bit periods using a clock, where n is a positive integer, comprising: generating n signals to mark the presence of digital ones during corresponding n time slots occurring during the same bit period; and combining the n signals into a single data channel to utilize abrupt phase changes of pulses in a single carrier signal at a carrier frequency, the phase changes having a very short duration to mark the presence of digital ones only in the n digital signals.

20. The improvement of claim 19 where combining the n signals into a single data channel comprises gating each of the n signals in a sequence of serially delayed time slots corresponding to each of the n signals during a portion of the same bit period in the single data channel during time positions reserved for unexpressed zeroes.

* * * * *